United States Patent
Vitrano, Jr. et al.

(10) Patent No.: US 7,941,337 B2
(45) Date of Patent: May 10, 2011

(54) WEB-BASED PARKING AND TRAFFIC MANAGEMENT SYSTEM AND METHOD

(75) Inventors: Anthony Vitrano, Jr., Orlando, FL (US); Thomas Halleran, Las Vegas, NV (US); Robert Klug, Laguna Beach, CA (US)

(73) Assignee: Standard Parking Corporation, Chicago, IL (US)

( * ) Notice: Subject to any disclaimer, the term of this patent is extended or adjusted under 35 U.S.C. 154(b) by 0 days.

(21) Appl. No.: 11/180,144

(22) Filed: Jul. 13, 2005

(65) Prior Publication Data

US 2006/0015397 A1    Jan. 19, 2006

Related U.S. Application Data

(60) Provisional application No. 60/587,764, filed on Jul. 14, 2004.

(51) Int. Cl.
  *G06Q 10/00*    (2006.01)
(52) U.S. Cl. ............... 705/13; 705/5; 705/1.1; 701/117; 701/200
(58) Field of Classification Search .................... 705/13, 705/1.1, 5; 340/932; 701/117, 200
  See application file for complete search history.

(56) References Cited

U.S. PATENT DOCUMENTS

| | | | |
|---|---|---|---|
| 5,777,565 A * | 7/1998 | Hayashi et al. | 340/928 |
| 6,246,337 B1 | 6/2001 | Rosenberg et al. | |
| 6,249,233 B1 | 6/2001 | Rosenberg et al. | |
| 6,340,935 B1 | 1/2002 | Hall | |
| 6,501,391 B1 | 12/2002 | Racunas, Jr. | |
| 6,519,329 B1 | 2/2003 | Hjelmvik | |
| 6,750,786 B1 | 6/2004 | Racunas, Jr. | |
| 6,754,580 B1 * | 6/2004 | Ask et al. | 701/117 |
| 6,865,539 B1 * | 3/2005 | Pugliese, III | 705/5 |
| 6,970,101 B1 * | 11/2005 | Squire et al. | 340/932.2 |
| 7,181,426 B2 * | 2/2007 | Dutta | 705/37 |
| 2002/0029164 A1 * | 3/2002 | Sugar et al. | 705/13 |
| 2002/0049535 A1 * | 4/2002 | Rigo et al. | 701/211 |
| 2002/0077953 A1 | 6/2002 | Dutta | |
| 2002/0087395 A1 | 7/2002 | Goodman, Jr. | |
| 2002/0099574 A1 | 7/2002 | Cahill et al. | |
| 2002/0147543 A1 * | 10/2002 | Gieseke | 701/200 |
| 2003/0055689 A1 * | 3/2003 | Block et al. | 705/5 |
| 2003/0097284 A1 | 5/2003 | Shinozaki | |
| 2003/0112154 A1 | 6/2003 | Yoakum et al. | |
| 2003/0144890 A1 | 7/2003 | Dan | |
| 2004/0015290 A1 * | 1/2004 | Curbow et al. | 701/117 |
| 2004/0032342 A1 | 2/2004 | Dunning | |

(Continued)

OTHER PUBLICATIONS

Haner (Article entitled "Gameday scores touchdown at bowl", published Jan. 9, 2004.*

(Continued)

*Primary Examiner* — Mahesh H Dwivedi
(74) *Attorney, Agent, or Firm* — William J. McNichol, Jr.; Reed Smith LLP

(57) ABSTRACT

The present invention is directed to a web-based system and method for managing traffic and congestion associated with large events while decreasing operating costs and increasing event revenues. A user accesses a webpage to purchase a parking pass for a predetermined event via a user interface. Once the parking lot has been determined and the spectator charged for the pass, a customized map and driving directions are generated for the spectator, detailing the route to the event the spectator is to follow. The system gives the event management advanced revenues and planning information to devise evacuation plans, emergency response plans, security, and traffic pattern designs.

31 Claims, 12 Drawing Sheets

U.S. PATENT DOCUMENTS

2004/0068433 A1* 4/2004 Chatterjee et al. .............. 705/13
2004/0117528 A1   6/2004 Beacher et al.
2004/0254840 A1* 12/2004 Slemmer et al. ................ 705/22
2005/0280555 A1* 12/2005 Warner ...................... 340/932.2

OTHER PUBLICATIONS

EP International Search Report Dated Apr. 7, 2009 for EP Applicaton No. 05775711.4-1238/1784742 PCT/US2005024817.

* cited by examiner

FIGURE 8 clickPARK
Your Space is Ready When You Are™

BILLING

*Your information is safe and secure.*
*See our Privacy Policy for more information.*

Log out

Review your order

| QUANTITY: | ITEM DESCRIPTION: | | CHARGE: |
|---|---|---|---|
| 1 | Lot D(Ch) - STANDARD AUTOMOBILE Parking<br>UCF Football vs West Virginia at Florida Citrus Bowl, Orlando, FL - 09/11/2004<br>Opens at 1:00 pm | | $10.00 |

↳ 802

Shipping Via: [Standard Mail ▼] ~804   $1.00  Recalculate

Service Fee:   $2.50

Total Charges:   $13.50

Enter Shipping Address

First Name: [_____] ~806
Last Name: [_____] ~808
Address 1: [_____] ~810
Address 2: [_____] ~812
City: [_____] ~814
State: [Select a State ▼] ~816
Zip: [_____] ~818
Phone: [_____] ~820

800

Enter Billing Address

902 ☐ Use same address as shipping

First Name: _____ 904
Last Name: _____ 906
Address 1: _____ 908
Address 2: _____ 910
City: _____ 912
State: [Select a State ▼] 914
Zip: _____ 916
Phone: _____ 918

Enter credit card

Card Type: [Choose ▼] 920
Number: _____ 922
Expiration Date: [Month ▼] [Year ▼] 924
Card ID Number: ____ what is this? 926

Card Identification Number

Visa, Mastercard:
Located on the back of your card

American Express:
Located on the front of your card

928 ☐ Store credit card and billing information in our secure system to make future purchases faster. You will have the opportunity later in the process to manage your account settings. Privacy Policy

Submit Order

[Submit Order »] 930    Your credit card will be charged.

Refunds and Exchanges
This purchase is non-refundable.

*FIGURE 9* clickPARK
Your Space is Ready When You Are™

Log out

Your order has been confirmed!
You can track the status of your parking passes in My Orders.

▶ ▶ ▶ *TO COMPLETE YOUR ORDER:* ~1102
*Click here to review your customized driving directions.*

Order #305

| Item(s) Ordered: | Price: |
|---|---|
| 1 Lot D(Ch) - STANDARD AUTOMOBILE Parking | $10.00 |
| *Opens at 1:00 pm* | |
| UCF Football vs West Virginia - Florida Citrus Bowl | |
| Orlando, FL - 09/11/2004 6pm | |

| | |
|---|---|
| Item(s) Subtotal: | $10.00 |
| Shipping / Handling: | $1.00 |
| Service Fee: | $2.50 |
| Total Charges: | $13.50 |

Shipping Address:
Tony Vitrano
1 Citrus Bowl Place Suite 203
Orlando, FL 32805
US

Payment Method:
amex | Last 4 digits: 2013

Billing Address:
Tony Vitrano
1 Citrus Bowl Place Suite 203
Orlando, FL 32805
US

1100

Copyright 2004 Click and Park - All rights reserved.

*FIGURE 11*

1200

Thanks for your order, Tony Vitrano!

You can track the status of your parking passes in My Orders.

Order #305

| Shipping Address: | Item(s) Ordered: | Price: |
|---|---|---|
| Tony Vitrano<br>1 Citrus Bowl Place<br>Suite 203<br>Orlando, FL 32805<br>US | 1 Lot D(Ch) - STANDARD AUTOMOBILE Parking<br>Opens at 1:00 pm<br><u>UCF Football vs West Virginia - Florida Citrus Bowl</u><br>Orlando, FL - 09/11/2004 6pm | $10.00 |
| Payment Method:<br>amex \| Last 4 digits: 2013 | Item(s) Subtotal:<br>Shipping / Handling:<br>Service Fee:<br>Total Charges: | $10.00<br>$1.00<br>$2.50<br>$13.50 |
| Billing Address:<br>Tony Vitrano<br>1 Citrus Bowl Place<br>Suite 203<br>Orlando, FL 32805<br>US | | |

Questions or comments? You may reach us via e-mail at info@clickandpark.com. Or, please call 1-866-330-PARK Monday - Friday, 8:00 AM to 5:00 PM (EST).

Thank you for choosing Click and Park, we appreciate your business.

Click and Park
http://clickandpark.com

Copyright (c) 2004 Click and Park - All rights reserved.

*FIGURE 12*

WEB-BASED PARKING AND TRAFFIC MANAGEMENT SYSTEM AND METHOD

CROSS-REFERENCE TO RELATED APPLICATIONS

This application claims priority to U.S. Provisional Patent Application Ser. No. 60/587,764, filed Jul. 14, 2004 entitled, "WEB-BASED PARKING AND TRAFFIC MANAGEMENT SYSTEM AND METHOD".

BACKGROUND OF THE INVENTION

The present invention relates generally to parking systems. More particularly, this invention is directed to a system and method for managing and controlling the flow of traffic to and from events. This invention is particularly useful in improving traffic and parking congestion, decreasing operational costs, and increasing event revenues.

Major sporting events, rock concerts, monster truck shows, and the like, require moving approximately 30,000 to 70,000 or more people into and out of a stadium, concert hall, coliseum, and the like. The typical event requires a spectator to drive to the venue and pay a fee to park. The fee is typically dependent upon the proximity to the event location and is capable of a wide range of associated expense. Once parking has been paid for, the spectator then must find a parking space, involving approximately 5-10 minutes of searching through the lot for an appealing, available space. Having located a parking space, the spectator then exits the vehicle and must walk to the event venue from the parking lot, involving another 10-15 minutes, depending upon the location of the lot in which the spectator has parked. Once inside the event venue, the spectator spends another 10-15 minutes in locating their seats.

When taking into account increased security measures for large spectator events, the actual time spent in travel, parking and seat location ranges from 30 minutes to 1 hour 30 minutes, allowing for searches, metal detectors, and the like. In order to account for the amount of time required, the typical spectator makes it a habit of arriving 1 hour early, just to avoid the worst of the parking congestion.

Leaving the event venue proves even more problematic, as the departure of all spectators at one time overloads the available egress routes. Once an event has ended, leaving the event venue provides an even larger amount of travel time. For example, assuming a spectator waits until the event is over, the spectator spends approximately 25 to 30 minutes just to exit the venue on foot. When the spectator has exited the structure, he or she must then spend a greater amount of time walking to his or her vehicle as a result of the increased pedestrian congestion, as a multitude of spectators attempt to exit the structure at approximately the same time. Thus, the spectator spends 20 to 30 minutes simply walking back to his or her car.

Having located the vehicle, the spectator must anywhere from 40 minutes to 1 hour, as traffic builds, before even exiting the parking lot. Leaving the parking lot and entering a street near the venue does not decrease the travel time home for the spectator. In actuality, the spectator can expect to spend an ever increasing amount of time as streets and thoroughfares are overloaded by vehicles leaving parking surrounding the event venue. The average spectator, while taking 1 hour to 1 hour 30 minutes to get to the venue, expects to spend approximately 2 to 3 hours prior to returning home. The foregoing example assumed the spectator waits until the event is over, however a growing majority of spectators leave the event early, just to avoid the traffic and congestion that occurs when the event ends.

In addition to the time spent by the spectator to get to and from the event, costs are incurred by the event management, local law enforcement and municipalities. The event management must outlay ever increasing capital in labor expenses to provide parking attendants and security staff. The event management staff is also required to provide evacuation planning from the venue, as well as ensure that emergency vehicles have unobstructed access to the structure to deal with the various medical and other emergency situations that arise when large crowds of people gather in one place.

Local law enforcement is typically overwhelmed, as spectators arrive from well outside their jurisdiction, overwhelming the available local personnel by shear numbers alone. Additionally, the increased spectator traffic, both vehicular and pedestrian, typically result in a higher than normal incident of accidents, which the local law enforcement personnel must then handle. Further, the local municipality traffic pattern is altered well beyond its design. The municipality must then spend funds on additional law enforcement personnel simply to direct traffic, in addition to those law enforcement and emergency personnel required to handle security and emergency situations.

Current event planning does not allow law enforcement and event management to control the number of vehicles on roads to and from the venue simply because the spectators do not arrive in the most efficient manner. Thus, the spectator arrives following a route that is not the most efficient use of traffic patterns, increasing the congestion as the spectator attempts to locate a suitable parking lot. The haphazard arrival of the spectators to the venue is not an even distribution, thus parking is lopsided and congestion results therefrom.

There is thus a need for a system and method to control and manage traffic and parking congestion, decrease the operational costs, and increasing event revenues.

BRIEF SUMMARY OF THE INVENTION

In view of the aforementioned needs, there is contemplated a system and method to control and manage the traffic and parking congestion associated with large events, while decreasing the operational costs and increasing the event revenues.

In accordance with the present invention, there is provided a web-based system and for managing traffic and congestion associated with large events while decreasing operating costs and increasing event revenues.

Further in accordance with the present invention, there is provided a method for managing event traffic flow via a computer network. The method begins by receiving data representing a user selected event from a user interface and then retrieving from an associated database, information about the event, including the event venue, at least one available parking location, and the cost of the available parking location. The event information is then displayed to the user on the user interface. Payment data corresponding to the available parking location is then received and the payment data is verified.

In a preferred embodiment, a recommended parking location and at least one alternative parking location are displayed to the user, along with the event information. The method also includes the steps of receiving information corresponding to a point of origin associated with the user, retrieving a list of travel routes from the point of origin to the venue from a second associated database, and displaying at least one travel route from the list to the associated user via the user interface. In one embodiment, the method determines the status of the user as either an existing customer or a new customer. The new customer is then prompted to enter user account information and account data for the existing user is then retrieved.

Still further, in accordance with the present invention, there is provided a system for managing event traffic flow via a computer network. The system includes means adapted for receiving, via a user interface, data representative of a selected event and means adapted for retrieving, from an associated database, event information corresponding to the selected event. The event information preferably includes data representing the event venue, at least one available parking location, and the cost of the available parking location. The system also includes means adapted for displaying the event information corresponding to the selected event to an associated user via the user interface. The system further includes means adapted for receiving data representative of a payment corresponding to the available parking location, and means adapted for verifying the payment data received.

In a preferred embodiment, the means adapted for displaying the event information also includes means adapted for displaying a recommended parking location and at least one available alternate parking location. The system also includes means adapted for receiving information corresponding to a point of origin associated with the user, means adapted for retrieving a list of travel routes from the point of origin to the venue from a second associated database, and means adapted for displaying at least one travel route from the list to the associated user via the user interface. In one embodiment, the system includes means adapted for determining the status of the user as an existing customer or a new customer. The new customer is then prompted to enter user account information and account data for the existing user is then retrieved.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which:

FIG. 3 is a template illustrating the event selection according to the present invention;

FIG. 4 is a template illustrating the parking type selection according to the present invention;

FIG. 8 is a template illustrating the input of shipping information according to the present invention;

FIG. 9 is a template illustrating the input of user billing information according to the present invention;

FIG. 11 is a template illustrating a user confirmation screen according to the present invention; and FIG. 12 is a template illustrating an order confirmation screen according to the present invention.

DETAILED DESCRIPTION OF THE INVENTION

This invention is directed to a system and method for managing event traffic flow via a computer network. More particularly, this invention is directed to a system and method for managing and controlling the flow of traffic to and from events. The system and method enable the increasing of event revenues, the decreasing in event operational costs, and the decreasing of parking and traffic congestion.

Figure 1:
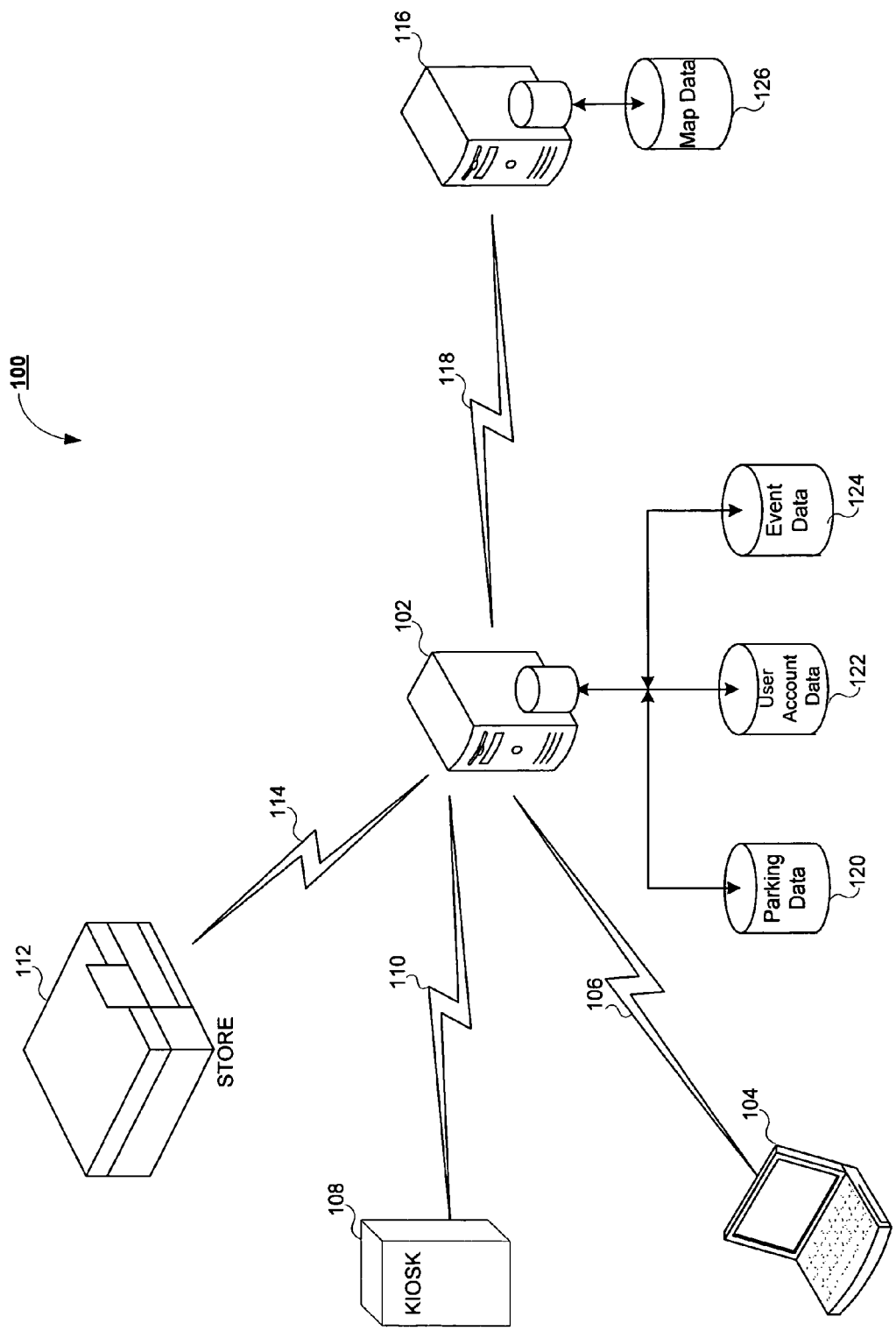
FIG. 1 is a block diagram illustrative of the system of the present invention.

FIG. 1 illustrates a block diagram preferred embodiment of the system according to the present invention generally designated as 100. As shown in FIG. 1, the system 100 includes a host server 102 in data communication with a user interface via a user interface device, such as a personal computer 104, a stand-alone kiosk 108, and a merchant location 112. In a preferred embodiment, the host server 102 uses a Linux-based operating system. The skilled artisan will appreciate that other server operating systems are capable of being employed on the host server 102, and the present invention is not limited solely to Linux-based software. Preferably, the host server 102 runs various software programs, including but not limited to Apache v.2, Perl scripts, HTML templates, and the like. It will further be appreciated by those skilled in the art that while the system 100 depicts a single host server 102, the invention is capable of using one or more servers, such as an application server, a database server, and a web presentation layer. The skilled artisan will understand that the addition of more than one server does not affect application of the present invention.

As will be understood by those skilled in the art, the user interface is suitably a computer software application operating on a personal electronic device equipped to communicate with a computer network. The preferred embodiment, described herein, uses a personal computer 104 in data communication with the host server 102 via a communications link 106, such as the Internet. It will be understood by the skilled artisan that the use of the personal computer 104 is for exemplification purposes only, and the present invention is not limited solely to such an application. As shown in FIG. 1, the stand alone kiosk 108, such as a mall kiosk, is suitably any such kiosk, e.g., an automated teller machine, or the like, as is known in the art.

The present invention is capable of being implemented via the kiosk 108 in data communication with the host server 102 over a suitable communications link 110, e.g., the Internet. In an alternate embodiment, a merchant location 112, such as a ticketing agent, is capable of communicating with the host server 102 via a suitable communications link 114, such as the Internet, to employ the present invention. The skilled artisan will appreciate that the personal computer 104 is further capable of directly communicating with the host server 102 via a wireless connection using Bluetooth®, 802.11a, b, or g (WiFi) and other such devices. As will be further understood, a user at one of the user interface devices, 104, 108, 112, suitably establishes a connection with the host server 102 via one of the corresponding communication links 106, 110, 114, to access the services provided by the host server 102.

The host server 102 is in data communication with multiple data sources, including a parking database 120, a user account database 122, and an event database 124. It will be understood by those skilled in the art that the databases 120-124 are capable of being stored in a single database or distinct databases. It will further be understood that the database or databases are implemented on a mass storage device in data communication with the host server 102. In the preferred embodiment, the databases 120-124 are located on two MySQL v.4 servers operating in a master/slave configuration. Thus, as will be appreciated by those skilled in the art, changes made to one database will be stored on both servers. The host server 102, via a suitable communications link 118, transmits and receives data corresponding to map information from a map server 116. The map server 116 is in data communication with a map database 126 corresponding to maps, driving directions and the like. Preferably, the map server 116 is a publicly available routing provider, such as MapQuest®.

When a user desires to purchase a parking pass for a specific event that employs the subject invention, the user accesses a web page via one of the user interfaces 104, 108, 112, that is hosted by the host server 102. Access is suitably accomplished via the Internet, and the web page is suitably displayed by any web browser known in the art. The user is prompted by the host server 102 to input a specific event or venue for parking pass purchasing. Once the user has input the event or venue, the host server 102 retrieves event information from the event database 124 and the parking database 120 corresponding to the selected event. The host server 102 then transmits the specific event information to the browser running on the user interface device 104, 108, 112. The user then purchases a parking pass corresponding to a parking location from the host server 102. The host server 102 communicates a request to the map server 116 for available routes from the user's point of origin to the event venue.

The host server 102 then determines if the route provided by the map server 116 is capable of handling the user, i.e., whether a predetermined number of parking passes have been sold corresponding to the route. When a predetermined number have been reached, the host server 102 queries the map server 116 for an alternate route from the user's point of origin to the event venue. This process continues until a routing is found that is capable of supporting the additional ingress and egress of the user. The host server 102 then transmits that routing information to the user interface device 104, 108, 112. The user is then prompted to pay for the desired parking pass and the transaction proceeds to verify the user account information with the user account database 122. The routing information and parking pass are then shipped to the user's shipping address upon confirmation of payment. In an alternate embodiment, the user is capable of printing out the route information directly from the user interface.

Figure 2:
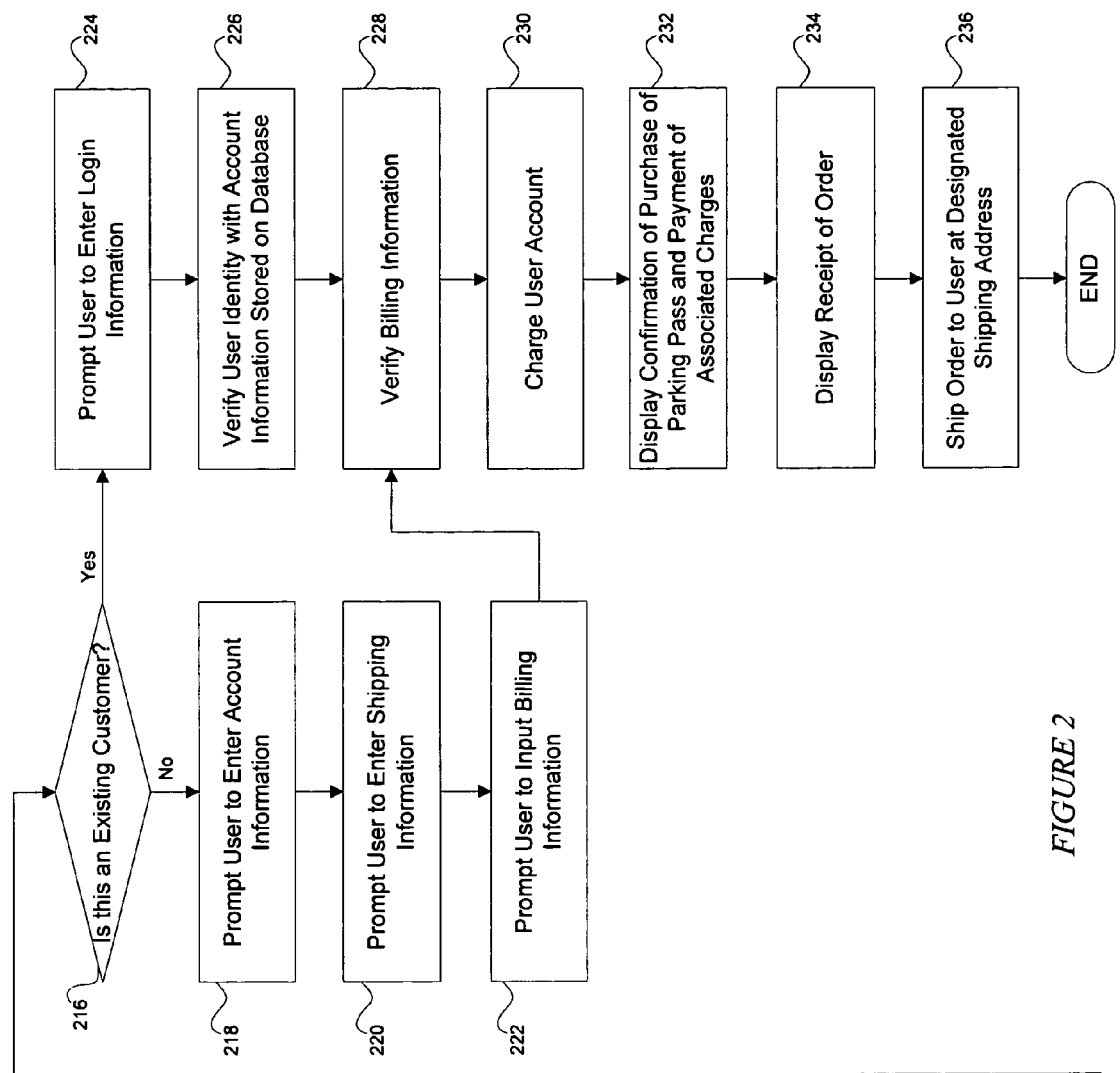
FIG. 2 is a flowchart illustrating the application direct secure erase process according to the present invention.
Figure 3:
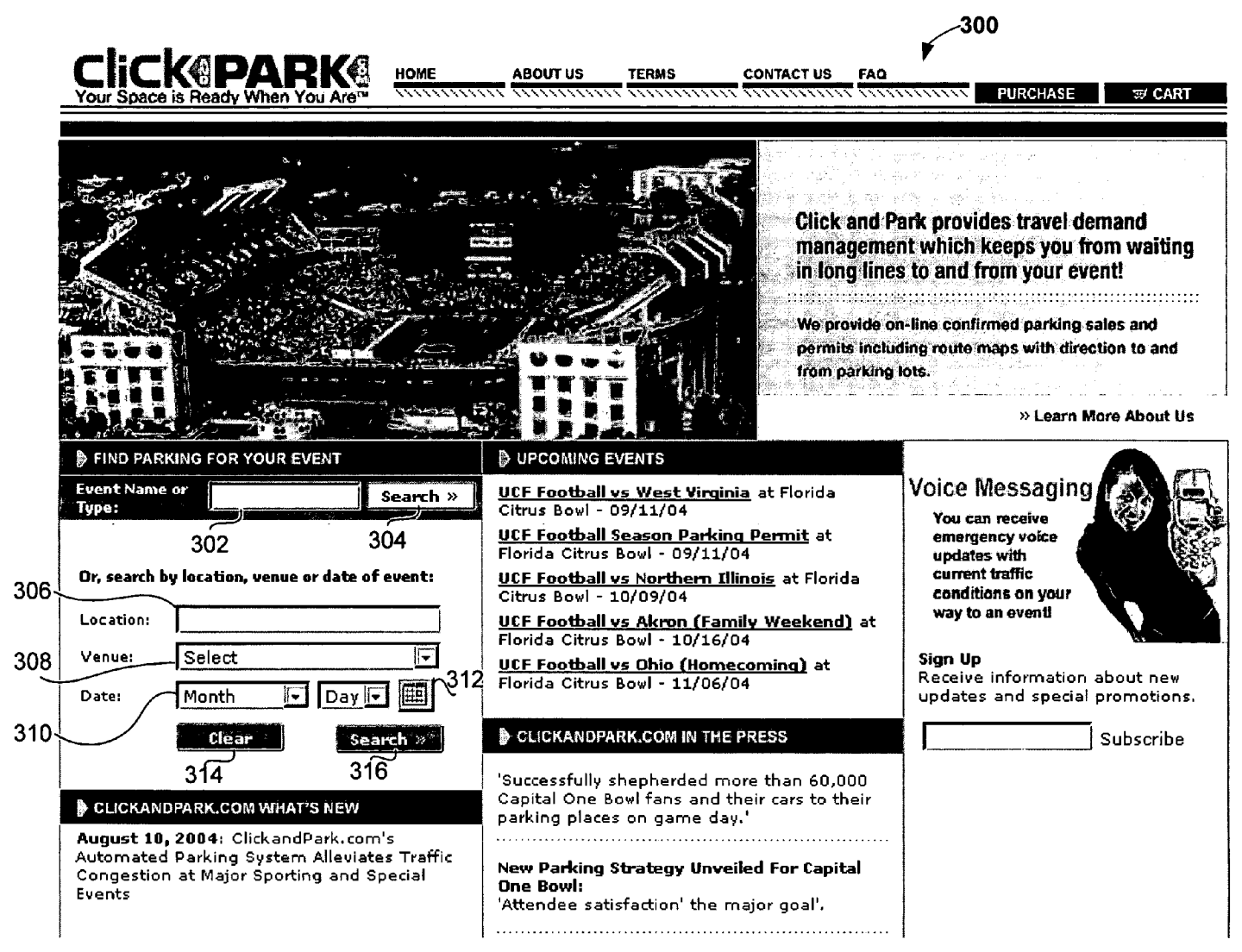

Turning now to FIG. 2, there is shown a flow chart illustrating the method of the present invention. The host server 102 begins by displaying to the user via a web browser on the user interface device 104 a welcome screen at step 202. At step 204, the host server 102 queries the user for event information corresponding to a particular event that the user desires to attend or purchase parking passes. FIG. 3 illustrates a sample template 300 for a screen displayed to the user to select event information. As shown in FIG. 3, the user is provided various means of selecting a particular event for which to purchase parking passes. When the user knows the name of the desired event, e.g., Super Bowl, World Series—Game 7, and the like, the user enters the name of the event into the field 302 and clicks the search button 304. Alternatively, when the user does not know the name of the event, or desires to purchase parking for an unnamed event in a given city, in a given venue or on a given day, the user enters the location, the venue and/or the date information in fields 306, 308, and 310, respectively. In addition to manually entering the month/day at fields 310, the template 300 enables the user to graphically select a month/date for searching by clicking the calendar icon 312, to initiate a popup window (not shown) for date/month selection. Once the user has entered in the known information, the user clicks the search button 316. Should the user desire to begin a new search, the user clicks the clear button 314, which erases all filled-in fields and allows a new search to be suitably input by the user.

Figure 4:
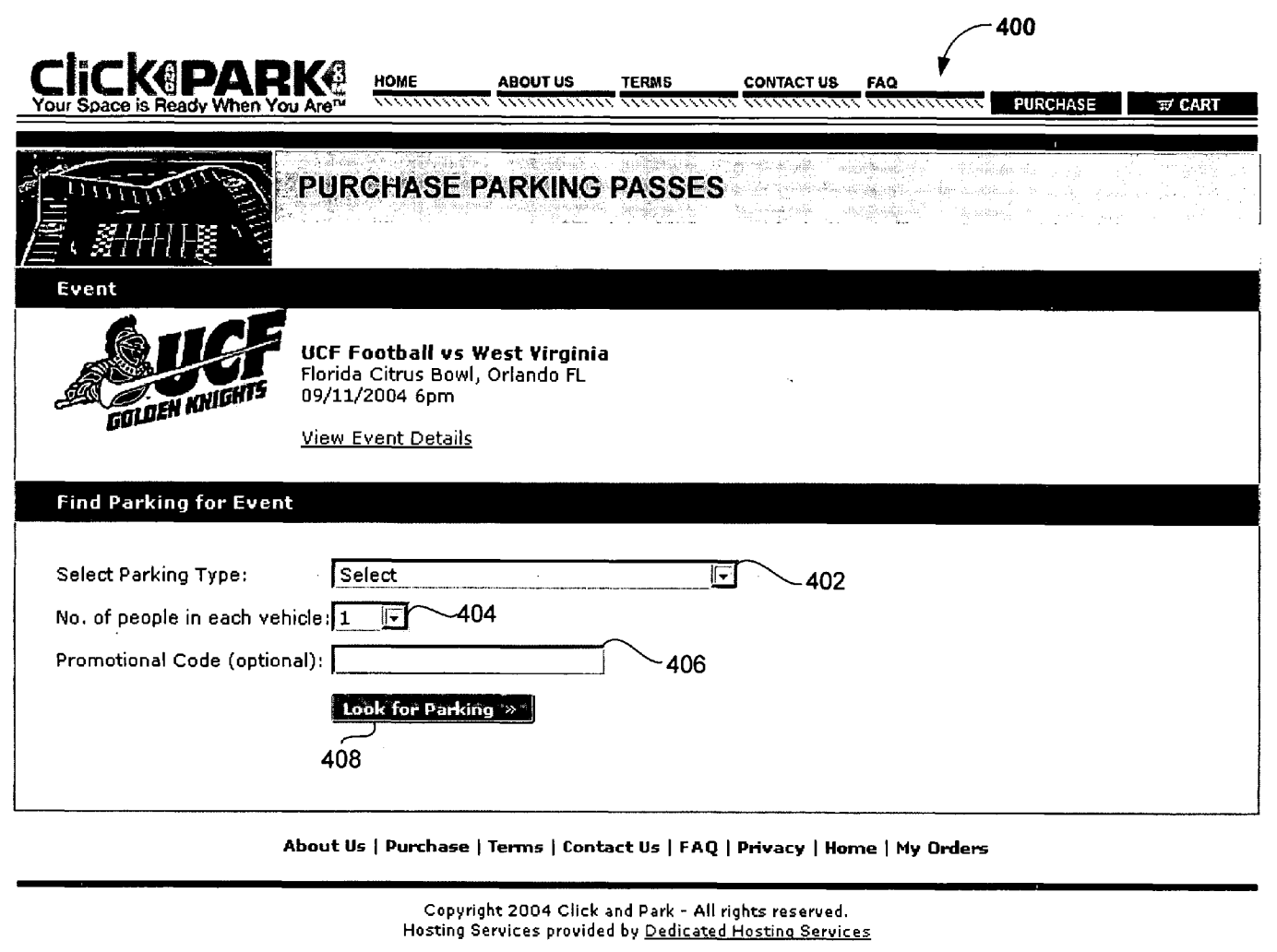

Using the information from the user, the host server 102 retrieves event information from a database containing event data at step 206. The event data includes, but is not limited to, event venue, begin/end times, date, location, fees, parking locations, and the like. Once the event information has been retrieved, the user is prompted at step 208 to select a parking type. FIG. 4 illustrates a sample template 400 of a screen displayed to the user to prompt the user to select the type of parking desired for the designated event. As shown in FIG. 4, the template 400 prompts the user to select a type of parking for the event from the pull-down menu 402. It will be appreciated that the parking type includes, but is not limited to, automobile, bus, recreational vehicle, truck, motorcycle, and the like. Having selected the type of parking, the user is prompted to select the number of people in each vehicle from the pull-down menu 404. In the event that the user has received a promotional code, e.g., an electronic coupon, the user enters this information in the promotional code field 406. When the user has completed the required information shown on the template 400, the user clicks the button 408 to search for available parking locations.

Figure 5:
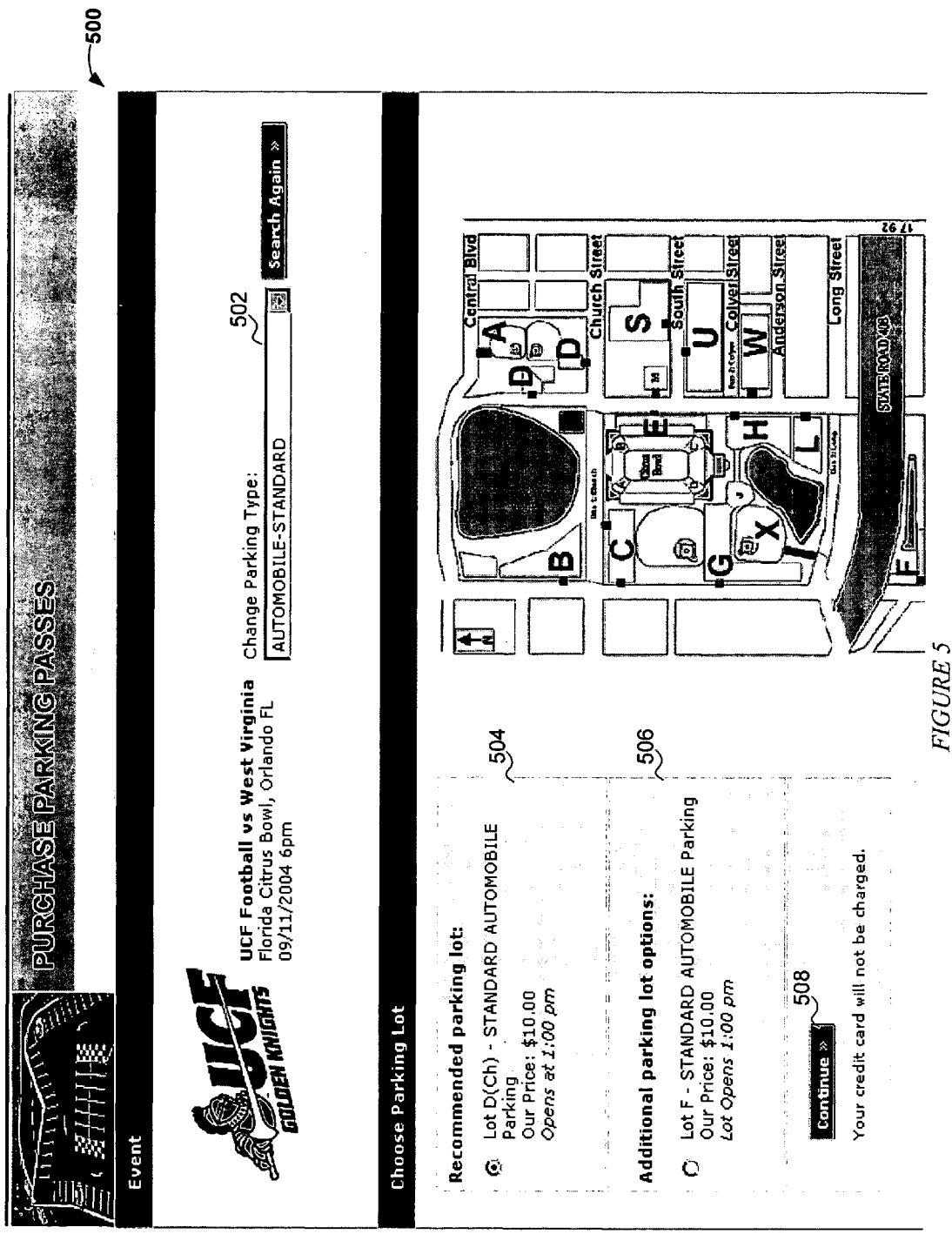
FIG. 5 is a template illustrating the selection of an available parking location according to the present invention.

The host server 102 receives the user inputs and retrieves a listing of available parking locations and associated costs from the parking data 120 and the event data 124 at step 210. The host server 102 then displays, via the user interface, a recommended parking location and one or more additional parking locations at step 212 for user selection. FIG. 5 illustrates a sample template 500 of a screen for selecting a parking lot from among a list of available parking lots. In addition to selecting one of the available parking lots, the template 500 enables the user to change the parking type from the pull-down menu 502. Thus, when the user determines that the type of parking previously selected in FIG. 4 was incorrect, the user selects a different option from the pull-down menu 502. As displayed to the user, the template illustrates a recommended parking location 504 and an available alternate parking location 506. The skilled artisan will appreciate that while only two parking lots are shown in FIG. 5, the present invention is capable of displaying all available alternate parking lots. Once the user has selected the desired parking location, the user clicks the continue button 508 and proceeds to the next step.

Figure 6:
FIG. 6 is a template illustrating the a shopping cart screen according to the present invention.

Returning to FIG. 2, after the user has selected one of the available parking locations, the method then proceeds to a shopping cart display, whereby the user is prompted at step 214 to select the number of parking passes desired. FIG. 6 illustrates a template 600 depicting a shopping cart screen according to the present invention. As will be understood by those skilled in the art, the shopping cart template 600 displays those items selected by the user for purchase. The template 600 shopping cart enables the user to delete a selected parking location, change the quantity of a selection. As shown, the user deletes a selected parking pass purchase by checking the delete field 602. In addition, the user is able to change the number of desired parking passes using the quantity pull-down menu 604. The price per pass is displayed for the user to review, to allow the user to change to a different parking pass or to cancel purchasing a pass entirely. When the user changes one of the delete field 602 or the quantity pull-down 604, an update cart button 606 becomes active. Once the changes have been made, the user clicks the update cart button 606 to update the quantity or to remove the item from the cart 600. After reviewing the order in the shopping cart template 600, the user clicks the proceed to checkout button 608 to proceed to paying for the parking pass.

Figure 7:
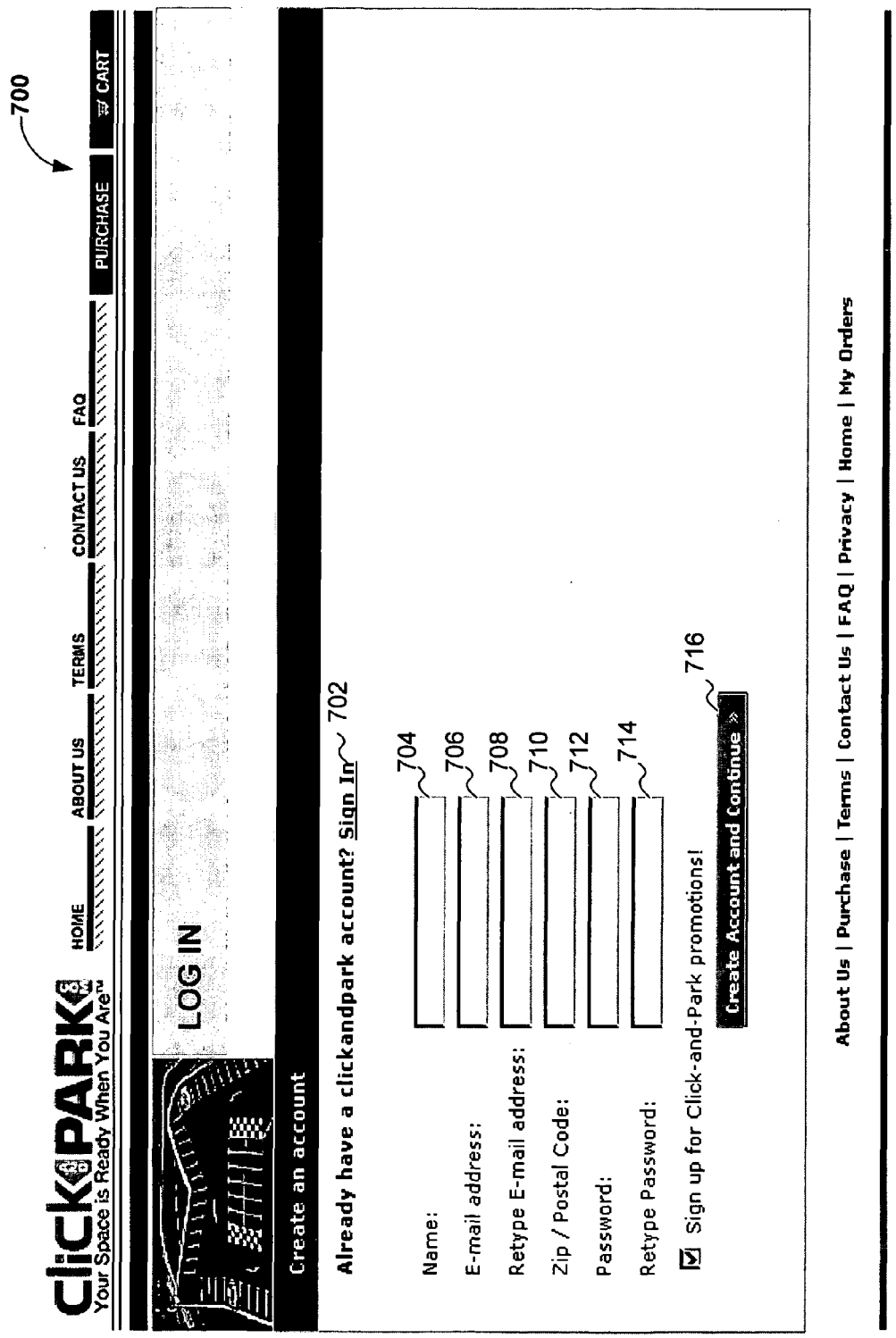
FIG. 7 is a template illustrating the input of user account information according to the present invention.

When the user has determined to proceed with the purchase, a determination is made at step 216 that the user is a new customer. The user is then prompted, at step 218 to create a new account by entering user information, such as an email address, a password, and a zip or postal code. FIG. 7 illustrates a new customer information template 700 for inputting user account information. As shown, the template 700 includes a variety of data fields for gathering information regarding the user. When the user is an existing customer and has arrived at the create an account template 700, the user is able to proceed to a login page by clicking the hyperlink 702 as an existing customer. When the user is a new customer, certain information is gathered by the template 700 for incorporation into the user's account. The user is prompted to enter a name and email address in fields 704 and 706, respectively. Next, the user re-enters the email address in field 708 and a zip or postal code in field 710. The user then selects a password and enters it in fields 712 and 714. When the user has finished entering this basic account information, the user checks the create account and continue button 716. The account information is then submitted to the host server 102 from the user interface via the Internet or other computer network.

After the new user creates a user account at step 218, the user then enters a shipping address for shipment of the purchased parking pass at step 220 and billing information at step 222. FIGS. 8 and 9 illustrate a template 800 and 900 for entering shipping information and billing information, respectively. Turning first to template 800, a user is shown the current order 802, including shipping and pricing information. The user is then able to change shipping options using the pull-down shipping menu 804. As will be understood by those skilled in the art, the cost associated with shipping is updated as the type of shipping is changed by the user. Also shown on template 800 are various shipping address information fields 806-820. The user inputs contact information corresponding to a first name 806, a last name 808, an address 810, with a second address field 812 provided for a second line of address, a city 814, a state selection from pull-down menu 816, a postal zip code 818, and a phone number 820. These fields represent contact information in the event that a problem arises with a parking pass order, as well as the destination address of the parking pass upon completion of an order. When the user has finished entering the information requested by template 800, the user is prompted to complete the billing information template 900.

Template 900 illustrates billing information fields that are requested to process a parking pass order. When the shipping address and billing address are the same, the user selects the field 902 to avoid having to reenter the same information twice. When the shipping address input at template 800 and the billing address requested at template 900 differ, the user enters the requested information in the fields 904-918. Thus, the user enters a first name 904, a last name 906, a first address line 908, a second address line 910 as needed, a city 912, a state selected from the pull-down menu 914, a zip code 916, and a phone number 918. Once the correct billing information has been entered, the user is prompted to input the method of payment. In the preferred embodiment, the method accepts payment by credit card.

As shown in FIG. 9, the user is prompted to select a card type from a pull-down menu 920. It will be understood by the skilled artisan that the card types include, but are not limited to, MasterCard®, Visa®, American Express®, and the like. Once the appropriate card has been selected, the user enters the card number in the card number field 922 and the month and year of expiration in the pull-down menus, designated at reference number 924. For further verification purposes, the user is also requested to enter the card. ID number in the corresponding field 926. To facilitate faster processing of future orders, the user is able to check the field 928, whereby the user's billing information is retained in the user's account. It will be appreciated by those skilled in the art that the user credit card data is stored in a secure database. Once the user has filled in the requested information and accepted the offer, the user clicks the submit order button 930.

Once the user has determined that the information has been entered correctly, at step 220, the user's billing information is verified at step 228. The user's selected credit card is then charged at step 230 and the user is presented a confirmation of the purchase of the parking pass at step 232. Template 1100 of FIG. 11 illustrates the confirmation order screen the user is presented to the user. The confirmation of order template 1100 includes the shipping address, the billing address and payment method, and the item or items ordered. The template 1100 includes a hyperlink 1102 enabling the user to view the customized driving directions retrieved from the map server 116 by the host server 102. A receipt is then displayed to the user for the user's records at step 234. The order is then shipped at step 236 to the user at the designated shipping address.

Figure 10:
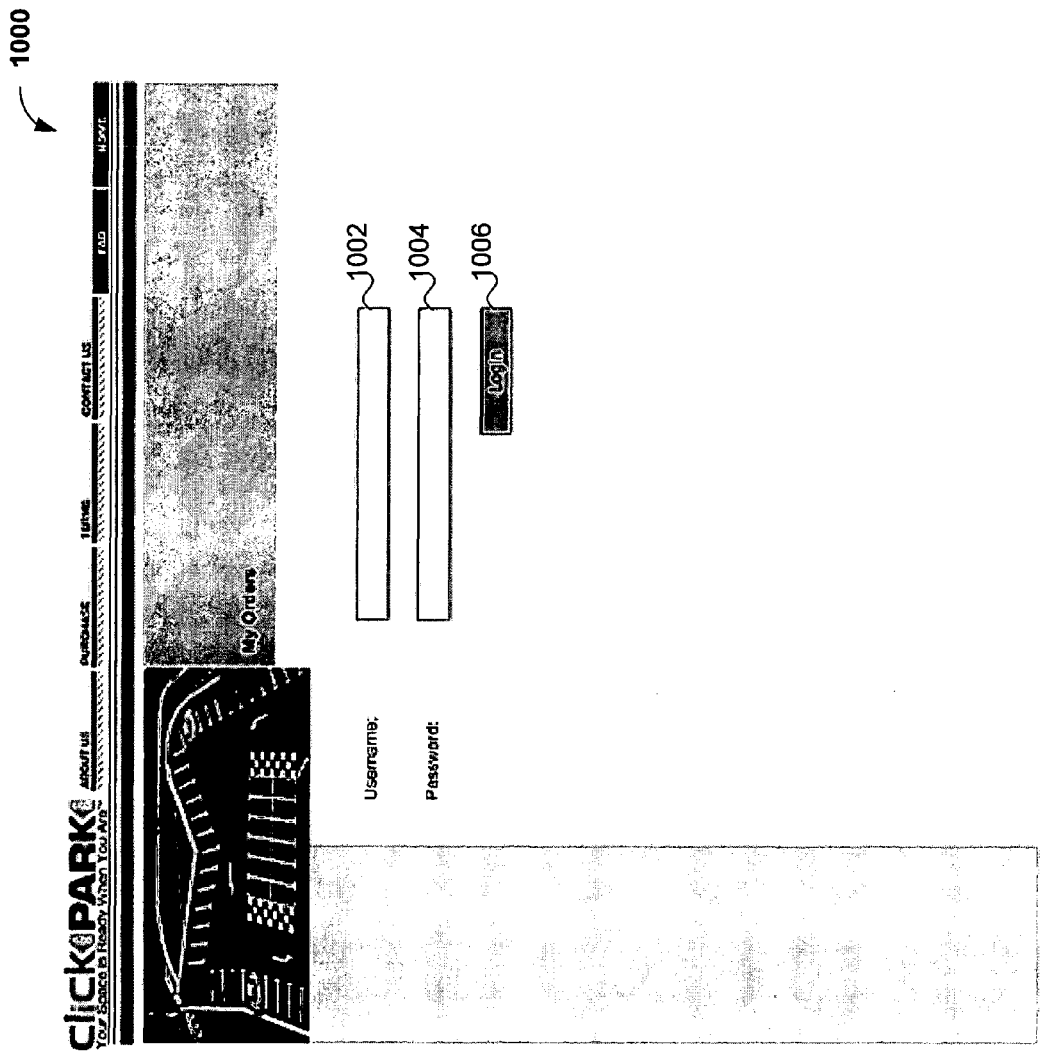
FIG. 10 is a template illustrating a user login screen according to the present invention.

Returning to step 216, when it is determined that the user is an existing customer, the user is prompted to login into his account at step 224. FIG. 10 illustrates a template 1000 showing the existing customer login screen. The user enters a username 1002 and corresponding password 1004. The user then clicks the login button 1006 to submit the information to the host server 102. The host server 102 then verifies the user identity with account data stored in a database at step 226. When the host server 102 has established the user's identity, the host server 102 verifies the existing payment information in the user account at step 228. The designated credit card is then charged at step 230 for the amount of the item or items purchased. The user is then presented with a confirmation of order screen at step 232, indicating that the order has been verified and processed. As shown in FIG. 11, the template 1100 displays the order information, shipping address, payment method and billing address, and the item ordered. The user is then presented with receipt at step 234 and the order is shipped at step 236 to the designated shipping address. FIG. 12 illustrates a template 1200 of a receipt displayed to the user after completion of the purchase of a parking pass.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for managing event traffic flow via a computer network, comprising the steps of:
   receiving, via a user interface, data representative of a selected event;
   displaying event information corresponding to the selected event, wherein the event information includes:
      data representative of a venue for the selected event,
      data representative of an available parking location, and
      data representative of a cost corresponding to the available parking location;
   receiving, via the user interface, information corresponding to a point of origin;
   selecting a recommended travel route from the point of origin to the venue, wherein the selection of the recommended travel route is based upon a predetermined number of sold parking passes corresponding to the recommended travel route;
   displaying the recommended travel route via the user interface;
   receiving payment data corresponding to the available parking location.

2. The method for managing event traffic flow via a computer network of claim 1, wherein the step of displaying the event information further comprises displaying a recommended parking location and at least one available alternate parking location.

3. The method for managing event traffic flow via a computer network of claim 1, wherein the recommended travel route is retrieved from a third-party map database.

4. The method for managing event traffic flow via a computer network of claim 1, further comprising the step of determining the status of the user, wherein the status of the user corresponds to at least one of the group consisting of an existing customer and a new customer.

5. The method for managing event traffic flow via a computer network of claim 4, wherein if the status of the user corresponds to a new customer, further comprising the steps of:
   receiving data representative of user information; and
   storing the user information in a user account on a user database.

6. The method for managing event traffic flow via a computer network of claim 4, wherein if the status of the user corresponds to an existing user, further comprising the step of retrieving user data from a user account database.

7. The method for managing event traffic flow via a computer network of claim 1, wherein the computer network is the Internet.

8. The method for managing event traffic flow via a computer network of claim 1, wherein the user interface is located on a remote electronic device.

9. The method for managing event traffic flow via a computer network of claim 8, wherein the remote electronic device is located in one of the group consisting of a kiosk and a store.

10. A system for managing event traffic flow via a computer network, comprising:
    a device adapted for receiving data representative of a selected event;
    a database adapted for retrieving event information corresponding to the selected event, wherein the event information includes:
       data representative of a venue for the selected event,
       data representative of an available parking location, and
       data representative of a cost corresponding to the at least one available parking location;
    wherein the device is further adapted for:
       receiving information corresponding to a point of origin;
       selecting a recommended travel route from the point of origin to the venue, wherein the selection of the recommended travel route is based upon a predetermined number of sold parking passes corresponding to the recommended travel route;
       receiving payment data corresponding to the available parking location.

11. The system for managing event traffic flow via a computer network of claim 10, wherein the device is adapted to select a recommended parking location and at least one available alternate parking location.

12. The system for managing event traffic flow via a computer network of claim 10, wherein the recommended travel route is retrieved from a third-party map database.

13. The system for managing event traffic flow via a computer network of claim 10, wherein the device is further adapted for determining the status of the user, wherein the status of the user corresponds to at least one of the group consisting of an existing customer and a new customer.

14. The system for managing event traffic flow via a computer network of claim 13, wherein the device is further adapted for:
    receiving data representative of new user information; and
    sending the new user information to a user database.

15. The system for managing event traffic flow via a computer network of claim 13, wherein the device is further adapted for retrieving user data from a user account.

16. The system for managing event traffic flow via a computer network of claim 10, wherein the computer network is the Internet.

17. The system for managing event traffic flow via a computer network of claim 10, wherein the user interface is located on a remote electronic device.

18. The system for managing event traffic flow via a computer network of claim 17, wherein the remote electronic device is located in one of the group consisting of a kiosk and a store.

19. A storage medium comprising program instructions, which when executed, implement a computer-implemented method for managing event traffic flow via a computer network, comprising the steps of:

receiving, via a user interface, data representative of a selected event;

displaying event information corresponding to the selected event, wherein the event information includes:
   data representative of a venue for the selected event,
   data representative of an available parking location, and
   data representative of a cost corresponding to the available parking location;

receiving, via the user interface, information corresponding to a point of origin;

selecting a recommended travel route from the point of origin to the venue, wherein the selection of the recommended travel route is based upon a predetermined number of sold parking passes corresponding to the recommended travel route;

displaying the recommended travel route via the user interface;

receiving payment data corresponding to the available parking location.

20. The storage medium of claim 19, wherein the step of displaying the event information further comprises displaying a recommended parking location and at least one available alternate parking location.

21. The storage medium of claim 19, wherein the recommended travel route is retrieved from a third-party map database.

22. The storage medium of claim 19, further comprising the step of determining the status of the user, wherein the status of the user corresponds to at least one of the group consisting of an existing customer and a new customer.

23. The storage medium of claim 22, wherein if the status of the user corresponds to a new customer, further comprising the steps of:
   receiving data representative of user information; and
   storing the user information in a user account on a user database.

24. The storage medium of claim 22, wherein if the status of the user corresponds to an existing user, further comprising the step of retrieving user data from a user account.

25. The storage medium of claim 19, wherein the computer network is the Internet.

26. The storage medium of claim 19, wherein the user interface is located on a remote electronic device.

27. The storage medium of claim 26, wherein the remote electronic device is located on a kiosk.

28. The storage medium of claim 26, wherein the remote electronic device is located in a store.

29. The method for managing event traffic flow via a computer network according to claim 1, wherein the selecting of the recommended travel route includes:
   requesting an initial travel route from the point of origin to the venue;
   selecting the initial travel route as the recommended travel route if a predetermined number of sold parking passes corresponding to the initial travel route is not exceeded; and
   selecting an alternate travel route as the recommended travel route if the predetermined number of sold parking passes corresponding to the initial travel route is exceeded, wherein a predetermined number of sold parking passes corresponding to the alternate travel route is not exceeded.

30. The system for managing event traffic flow via a computer network according to claim 10 wherein the user interface is further adapted for:
   requesting an initial travel route from the point of origin to the venue;
   selecting the initial travel route as the recommended travel route if a predetermined number of sold parking passes corresponding to the initial travel route is not exceeded; and
   selecting an alternate travel route as the recommended travel route if the predetermined number of sold parking passes corresponding to the initial travel route is exceeded, wherein a predetermined number of sold parking passes corresponding to the alternate travel route is not exceeded.

31. The storage medium of claim 19, wherein selecting the recommended travel route comprises at least one first travel route, wherein the at least one first travel route includes:
   requesting an initial travel route from the point of origin to the venue;
   selecting the initial travel route as the recommended travel route if a predetermined number of sold parking passes corresponding to the initial travel route is not exceeded; and
   selecting an alternate travel route as the recommended travel route if the predetermined number of sold parking passes corresponding to the initial travel route is exceeded, wherein a predetermined number of sold parking passes corresponding to the alternate travel route is not exceeded.

* * * * *